Figure 1:
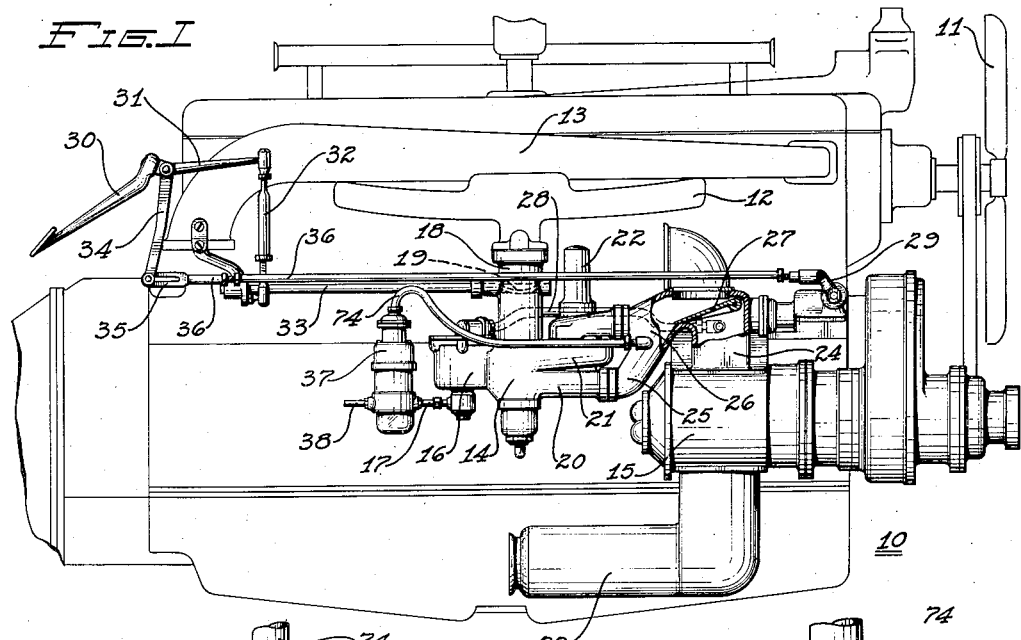

Jan. 2, 1934.   J. G. VINCENT   1,941,642

FUEL FEEDING SYSTEM

Filed March 17, 1928

Inventor
JESSE G. VINCENT.
By Mellen Tibbitts
Attorney

Patented Jan. 2, 1934

1,941,642

UNITED STATES PATENT OFFICE 1,941,642

FUEL FEEDING SYSTEM

Jesse G. Vincent, Detroit, Mich., assignor to Packard Motor Car Company, Detroit, Mich., a corporation of Michigan Application March 17, 1928. Serial No. 262,504

6 Claims. (Cl. 123—139)

This invention relates to fuel feeding systems and more particularly to fuel feeding systems for intermittently supercharged engines.

Ordinarily, motor vehicle engines are not supercharged. Generally, the float chamber of a carburetor is so arranged that it is under atmospheric pressure and the suction of the engine produces depressions and velocities in the intake manifold which draw the fuel out of the fuel outlet and mix it with the inrushing air. In this type of engine there is always a vacuum in the intake manifold and on the carburetor outlet and there are no variations from atmospheric pressure in the float chamber. Under these conditions there is no difficulty in feeding fuel to the carburetor, as uniform pressure obtained either by gravity or other means is all that is required.

When accelerating, climbing hills, or travelling at high speed it is frequently desirable to obtain more than normal pressure in the manifold and consequently in the float chamber, and for this purpose a supercharger is employed. It has been found desirable to employ a supercharger which is normally inoperative and when this type is used it is necessary to provide a normal air inlet for the carburetor and a vent from the float chamber, so that under ordinary unsupercharged conditions the parts will function in accordance with standard practice.

When an engine is equipped with this particular type of supercharger it is so connected that when the accelerator is pressed further than is necessary to obtain the full opening of the throttle the supercharger is brought into operation and simultaneously with the starting of the supercharger the normal air intake of the carburetor and the vent to the float chamber are cut off and the intake system as well as the float chamber is placed under pressure varying somewhat in degree, depending upon the speed with which the engine is operated. Under these conditions it will require more pressure to feed fuel into the float chamber which is, of course, now under pressure.

An object of this invention is to provide an impulse pump with means for varying the pressure on the fuel discharged therefrom to an amount exactly equal to the pressure produced in the main and auxiliary air inlets of the carburetor by a supercharger.

Figure 2:
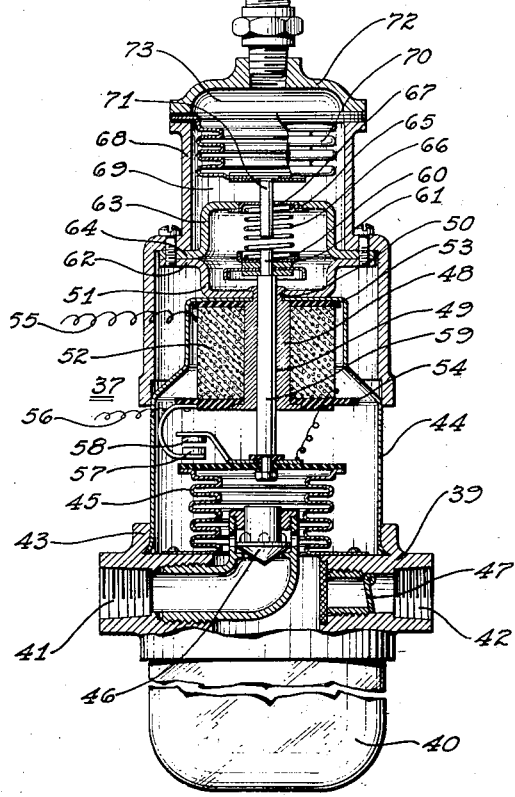
Figure 3:
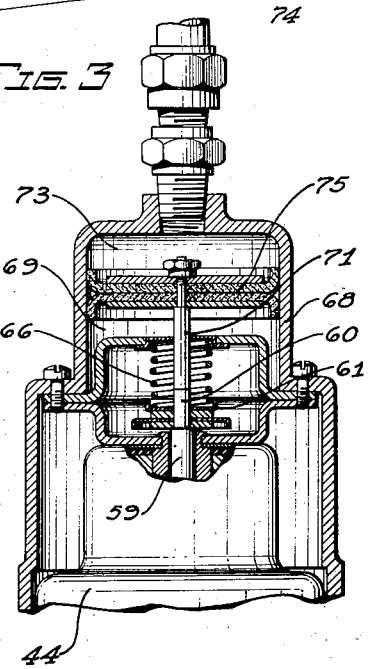

Other objects of the invention will appear from the following description taken in connection with the drawing which forms a part of this specification and in which:

Figure 1 is a side elevation of an internal combustion engine illustrating the invention as applied, Figure 2 is a vertical sectional view of the impulse pump, and Figure 3 is a modified form.

Referring to the drawing for more specific details of the invention, 10 represents generally an internal combustion engine having a cooling fan 11, an intake manifold 12 and an exhaust manifold 13. A carburetor 14 is connected to the intake manifold and connected to the carburetor is a supercharger or compressor 15. As shown, the carburetor is of the automatic float feed type having a float chamber 16 which receives its supply of fuel through a pipe line 17, a mixing chamber 18 in which is positioned a throttle valve 19 and main and auxiliary air inlets 20 and 21, the auxiliary air inlet being provided with a spring loaded valve, the casing of which is indicated at 22.

The supercharger or compressor 15 is provided with a casing having an inlet 23 and an outlet 24, the outlet being connected by suitable branches 25 and 26 to the main and auxiliary inlets of the carburetor 14, and positioned in the outlet is a flap valve 27 adapted to close the outlet 24 beyond its connection with the inlet of the carburetor when the supercharger is in operation, so that air will be forced under pressure from the supercharger through the branches 25 and 26 and the main and auxiliary air inlets 20 and 21 into the carburetor 14. The carburetor 14 has its float chamber 16 vented through a pipe line 28 connected to the outlet of the supercharger below the valve 27.

The supercharger is driven from the crank shaft of the engine preferably by a chain belt and is provided with a clutch mechanism controlled by a valve, the operating lever of which is indicated at 29. The carburetor and the supercharger are operatively connected to a foot accelerator pedal 30. As shown, the foot accelerator pedal has an arm 31 connected by suitable linkage 32 to a rod 33, mounted for rotation and suitably connected to the throttle valve 19. The foot accelerator pedal also has an arm 34 attached to an overrunning connection 35 on one end of a rod 36, the other end of which is pivotally connected to the valve lever 29 controlling the clutch mechanism of the supercharger. This arrangement of levers and linkage is such that when the accelerator pedal is pressed the throttle is operated to open and when the throttle has attained the full open position the supercharger is brought into operation. Upon starting the supercharger the normal air intake of the carburetor and the vent 28 to the float chamber are cut off by the closing of the valve 27, and the main and auxiliary intakes as well as the float chamber are placed under varying pressure depending upon the speed of the engine.

It necessarily follows that with the increased pressure in the carburetor there will be required more pressure to feed fuel into the float chamber. To meet this requirement an impulse pump 37 is connected between the carburetor and the source of fuel supply. As shown, the pump 37 is connected at its intake to a pipe line 38, leading from a supply tank, not shown, and the outlet of the pump is connected to the pipe line 17 leading to the float chamber of the carburetor. The pump 37 has a base 39 which supports a removable cleanout receptacle 40 and it is provided with an intake 41, an outlet 42 and an annular flange 43 projecting upwardly from the base in which is seated a casing 44. Positioned upon the base within the casing is a pump bellows 45 communicating with the intake 41 through a valve 46 adapted to seat on the delivery stroke of the pump. The pump bellows 45 also communicates with the receptacle 40 and outlet 42 which is provided with a suitable screen and a valve 47 adapted to seat and close the outlet upon the intake stroke of the pump.

Positioned in the top of the casing is a solenoid. As shown, the solenoid has a core 48 axially bored as indicated at 49 and provided with a reduced end portion 50. The reduced end portion extends through an opening in the top of the casing and through a registering opening in the bottom of a cup 51 and is upset or turned to secure these parts together. A coil 52 is wound upon the core 48 between end plates 53 and 54 formed of any suitable nonconducting material and the terminals 55 and 56 of the coil are connected to a suitable source of electrical energy, not shown, the terminal 56 being connected through a circuit breaker having one contact 57 supported on the end plate 54 and its other contact 58 carried by and installed from the pump bellows 45. Mounted in the bore of the core 48 is a plunger 59. This plunger is secured to the top of the pump bellows 45 and extends upwardly through and beyond the core 48 into the cup 51 and is provided with a reduced end portion 60 forming a support for a spring seat or rest 61.

The cup 51 has a radial flange 62 which supports an inverted cup 63 having a radial flange 64 which bears upon the flange 62 on the cup 51, the cup 63 having an axial opening 65, the object of which will hereinafter appear. The cups 51 and 63 provide a housing for a coil spring 66 positioned between the spring rest 61 on the plunger and a spring rest 67 seated in the opening 65 in the cup 63.

When the coil 52 is energized the plunger 59 moves upwardly to expand the pump bellows 45 which in expanding sucks in or draws a charge of fuel through the valve 46 whereupon the contacts 57 and 58 move apart to break the circuit and de-energize the coil. When the coil is deenergized the spring 66 actuates the plunger 59 to depress the bellows for feeding fuel through the outlet 42 and the pipe line 17 to the carburetor with the proper pressure. It is, of course, understood that the strength of the spring determines the pressure on the fuel as it is being fed to the carburetor and that this is the action under normal operating conditions of the engine.

When the supercharger is brought into operation it is necessary that there should be an increased pressure on the fuel being fed to the carburetor and to provide for this an auxiliary casing 68 is positioned upon the casing 44 and secured in position upon the radial flanges on the cups 51 and 63. The casing 68 has a cylindrical chamber 69 in which is positioned a bellows 70. This bellows is a duplicate of the pump bellows and has attached thereto a rod or shaft 71 extending downwardly through an opening in the spring seat 67, the rod being adapted to engage the upper end of the plunger 59. The casing 68 has a cap or hood 72 which provides a chamber 73 communicating with the bellows 70 and the chamber 73 is connected by a pipe line 74 to the throat of the main and auxiliary air inlets of the carburetor.

In Fig. 3, I have shown a modified form wherein a piston 75 is employed in lieu of the bellows 70 and the casing 68 is formed in one part instead of in two parts as shown in the preferred form. In this form the chamber is the equivalent to chambers 69 and 73, shown in the other form.

Since the chamber 73 above the bellows 70 or piston 75, as the case may be, is connected to the throat of the main and auxiliary air inlets of the carburetor, when the supercharger is brought into operation the exact pressure existing in the supercharged main and auxiliary air inlets of the carburetor is supplied through the pipe line 74 to the bellows 70 or the piston 75, as the case may be, and thus steps up the pressure on the pump bellows 45 to an amount exactly equal to the pressure produced by the supercharger, thus increasing the pressure on fuel fed to the carburetor in an amount exactly equal to the pressure produced in the main and auxiliary air inlets of the carburetor.

While the invention has been shown and described in connection with an impulse pump of a particular type it is to be understood that the invention is applicable to any type of pump where the pumping element is returned by a spring which determines the pressure on the fuel being fed. The principles involved are susceptible of numerous other applications that will readily occur to persons skilled in the art. The invention is, therefore, to be limited only as indicated by the appended claims.

Having thus described the various features of my invention, what I claim as new and desire to secure by Letters Patent is:

1. A fuel feeding system for an internal combustion engine comprising a carburetor, a supercharger connected with the carburetor, a pump connected therewith having a pumping bellows, a spring for actuating the pump on the exhaust stroke of the bellows, an electrical means for actuating the pump on the intake stroke of the pumping bellows, a pressure responsive means adapted to positively engage said electrical means and coacting with the spring and connected to the air intake of the carburetor for stepping up the pressure on the exhaust stroke of the pump to an amount equal to the increased pressure in the carburetor produced by the supercharger.

2. A fuel feeding system for an internal combustion engine comprising a carburetor, a supercharger connected with the carburetor, an impulse pump connected therewith having a pumping bellows, a solenoid for actuating the bellows on the intake stroke, a spring for actuating the bellows on the exhaust stroke, a pressure responsive means including a bellows adaptable to positively engage said means for coaction with the spring and connected to the air intake of the carburetor for stepping up the pressure on the exhaust stroke of the pumping bellows to feed fuel under pressure to the carburetor to an amount exactly equal to the pressure produced in the carburetor by the supercharger.

3. A fuel feeding system for an internal combustion engine comprising a carburetor, a supercharger associated with the carburetor, an impulse pump connected with the carburetor having a pumping bellows, a piston connected to the pumping bellows, a solenoid on the piston for actuating the bellows on the intake stroke thereof, a coil spring engaging the piston for actuating the bellows on the exhaust stroke thereof, a pressure responsive means including a bellows connected to the air intake of the carburetor and adaptable for cooperation with the spring for stepping up pressure on the fuel fed to the carburetor by the pump to an amount exactly equal to the pressure produced in the carburetor by the supercharger.

4. In an internal combustion engine, an intermittently operating supercharger, a fuel pump comprising a pumping bellows, means for expanding the pumping bellows on the pump intake stroke, a spring associated with said means for contracting the pumping bellows on the pump exhaust stroke, and a spring bellows adapted to be associated in positive engagement with said means, said spring bellows being connected to be actuated by air pressure developed by the supercharger and supplementing the effect of said spring during the exhaust stroke.

5. In an internal combustion engine, an intermittently operating supercharger, a fuel pump comprising a pumping bellows, means for expanding the pumping bellows on the pump intake stroke, a spring associated with said means for contracting the pumping bellows on the pump exhaust stroke, and means responsive to air pressure developed by the supercharger positively engageable with said expanding means for supplementing the effect of said spring during the exhaust stroke.

6. In an internal combustion engine having an intermittently operating supercharger and a fuel feed line, fuel feeding means comprising a housing having superposed chambers, one of said chambers being connected in the feed line and another chamber being open to the air delivered by the supercharger, one-way valves associated with the connections between the feed line and the associated chamber, pump means including bellows, communicating with the chamber in the feed line, and a pump, means for expanding the bellows to cause an intake stroke, spring means associated with the plunger for contracting the bellows to cause a discharge stroke, a spring bellows in the chamber open to the supercharger, and means adapted to provide a positive connection between the spring bellows and the plunger thereby augmenting the spring means during the contraction of the bellows.

JESSE G. VINCENT.